United States Patent [19]
Maeda et al.

[11] 3,987,268
[45] Oct. 19, 1976

[54] POWER SWITCHING AND CONTROL MECHANISM FOR INDUCTION HEATING APPARATUS

[75] Inventors: Shigeru Maeda; Akira Ithuzi, both of Osaka, Japan

[73] Assignees: Matsushita Electric Industrial Co., Ltd.; Kyokuto Electric Company, Limited, both of Japan

[22] Filed: Sept. 25, 1974

[21] Appl. No.: 509,052

[52] U.S. Cl. .......................... 219/10.49; 219/10.77; 219/10.79; 200/613; 200/17 R; 200/153 V
[51] Int. Cl.² ........................................ H05B 5/04
[58] Field of Search .......... 219/10.49, 10.77, 10.79; 200/6 B, 6 BA, 6 C, 17 R, 18 R, 153 LB, 153 V, 153 S, 52 R, 61.58 R

[56] References Cited
UNITED STATES PATENTS

| | | | |
|---|---|---|---|
| 2,506,653 | 5/1950 | Soneng et al. | 200/18 |
| 3,186,252 | 6/1965 | Olandt | 200/61.58 R |
| 3,407,278 | 10/1968 | Stoi | 200/153 V |
| 3,419,684 | 12/1968 | Lord et al. | 200/6 B X |
| 3,543,589 | 12/1970 | Loughrey | 200/153 LB X |
| 3,710,062 | 1/1973 | Peters | 219/10.49 |
| 3,781,503 | 12/1973 | Haanden et al. | 219/ |
| 3,821,509 | 6/1974 | Amogami et al. | 219/10.77 |
| 3,898,410 | 8/1975 | Peters | 219/10.49 |

Primary Examiner—Bruce A. Reynolds
Attorney, Agent, or Firm—Robert E. Burns; Emmanuel J. Lobato; Bruce L. Adams

[57] ABSTRACT

A first hollow control shaft is rotatable within a housing between actuating and restoring positions with intermediate ON-OFF positions therebetween. A first insulating actuator is rotatable within the housing to operate at least a pair of normally open contacts. A second insulating actuator is slidable along a predetermined path and normally biased to operate normally closed contacts and engageable with the first actuator by a lost motion connection which permits the second actuator to move in a limited range with respect to the rotational movement of the control shaft. The normally closed contacts are placed in a trigger circuit of an induction heating apparatus and the normally open contacts placed in a power supply circuit of the apparatus, the former being operated to disable the trigger circuit prior to energization or de-energization of the power supply circuit. A second control shaft is journaled through the first control shaft. A pinion gear is mounted on the second shaft. A rack is slidable within the housing and engages the pinion. An elevating mechanism is provided on which an induction heating coil of the induction heating apparatus is placed to adjustably heat a utensil located adjacent the coil. A connecting wire couples the rack and the elevating mechanism to effect raising and lowering of the coil to a desired position by rotation of the second shaft.

17 Claims, 13 Drawing Figures

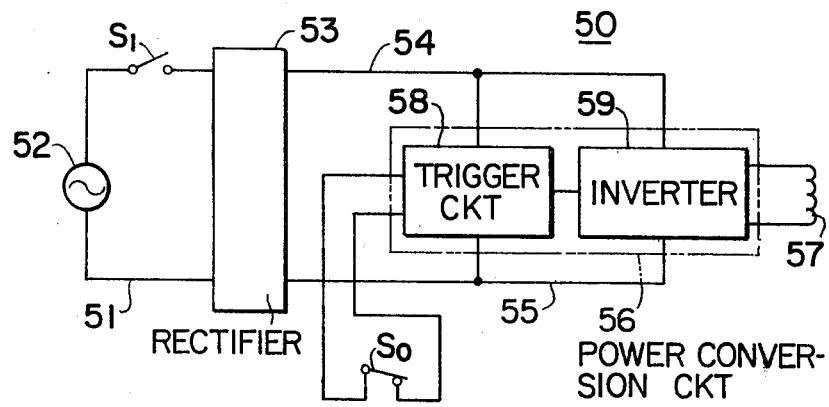
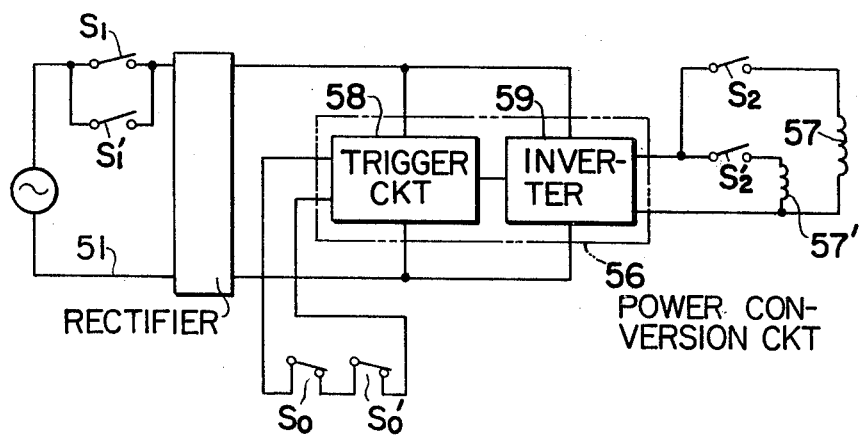
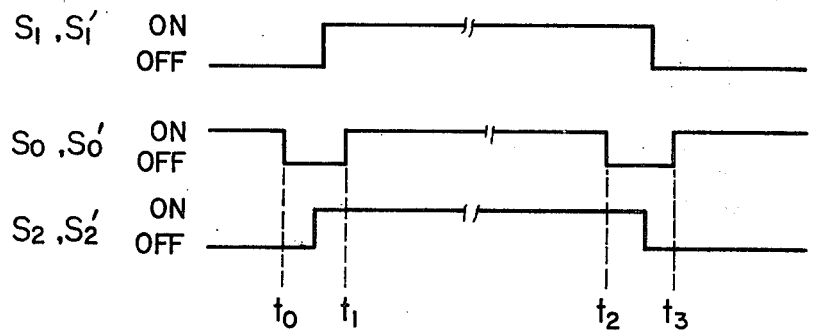

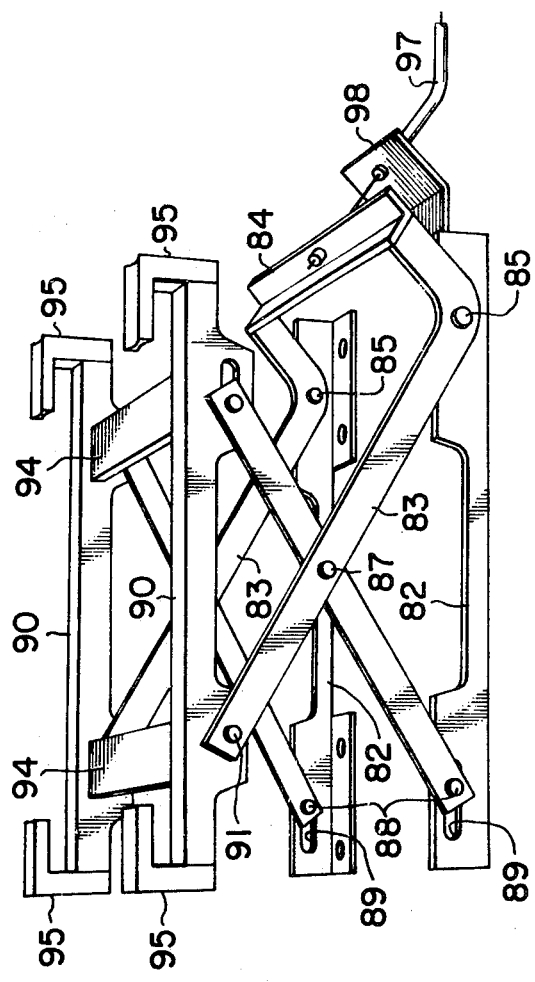

POWER SWITCHING AND CONTROL MECHANISM FOR INDUCTION HEATING APPARATUS

BACKGROUND OF THE INVENTION

The present invention relates generally to induction heating apparatus, and more particularly to a power switching and control mechanism for use with the induction heating apparatus.

A prior art induction heating apparatus, disclosed in U.S. Pat. No. 3,821,509 which is assigned to the instant assignee comprises an induction heating coil, a power conversion circuit which generates a high voltage ultrasonic frequency wave that drives the induction heating coil, and a full-wave rectifier coupled to an alternating-current power supply to supply the power conversion circuit with a high voltage unfiltered unidirectional potential. The power conversion circuit includes an inverter having a silicon-controlled rectifier and a diode connected in inverse parallel relationship thereto. The silicon-controlled rectifier is triggered by low voltage pulses generated by a trigger circuit coupled to the full-wave rectifier. The induction heating coil generates an alternating magnetic field that produces heat in a utensil located adjacent thereto by inductive coupling.

However, the ON-OFF switching of the induction heating apparatus causes would initiate a large current to flow in the power supply circuit due to generation of the high-voltage ultrasonic frequency wave and sparking occurs between contacts of the switch. If the apparatus employs two or more of the induction heating coils which must be switched on and off independently, sparking may also occur between contacts of the associated switches. This results in wear of contacts and frequent replacement will be required.

SUMMARY OF THE INVENTION

One object of the invention is to provide an electrical switch which has a pair of normally closed contacts arranged to be initially operated and at least a pair of normally open contacts subsequently operated by a lost motion.

A further object of the invention is to provide a uniaxial power switching and control mechanism in which switching and control units are cooperative so that the control unit is automatically restored to normal position when said switching unit is restored.

Another object of the invention is to provide an improved induction heating apparatus which is free from sparking between contacts of switches due to generation of high-voltage ultrasonic frequency wave.

Still another object of the invention is to provide an improved induction heating apparatus in which a plurality of induction heating coils are independently switched on and off and independently power-controlled.

Still another object of the invention is to provide an elevating mechanism to raise and lower an induction heating coil of an induction heating apparatus in order that the heating coil is substantially continuously controlled in height position with respect to the utensil supporting surface.

To achieve these objectives, the switch of the present invention comprises a first hollow control shaft rotatable within a housing between an actuating and restoring positions with intermediate ON-OFF positions therebetween, at least a pair of normally open contacts and a pair of normally closed contacts mounted in the housing, a first insulating actuator rotatable between the ON and OFF positions within the housing, a second insulating actuator slidable along a predetermined path on the first actuator with the rotational movement of the control shaft. The first actuator is adapted to be operated by the second actuator by a lost motion connection which permits the second actuator to move in the predetermined path with respect to the movement of the control shaft. The second actuator is normally biased to be held in a normal position to engage the operating member of the normally closed contacts to thereby return the shaft to the ON-OFF positions and to disengage therefrom when it is caused to slide along the predetermined path when the shaft is manually rotated to either of the actuating and restoring positions. The normally open contacts are placed in a power supply circuit of the induction heating apparatus and the normally closed contacts placed in a trigger circuit thereof adapted to generate a high-voltage ultrasonic frequency wave to drive the induction heating coil placed on an elevating mechanism of a power control arrangement of the invention.

When the control shaft is rotated from the OFF position to the actuating position, the normally closed contacts are opened to disable the trigger circuit prior to closure of the normally open contacts to energize the power supply circuit. The normally closed contacts are subsequently closed by return movement of the second actuator with the first actuator and the control shaft being held in the ON position. When the induction heating apparatus is de-energized, the control shaft is rotated from the ON position to the restoring position. The normally closed contacts are opened to disable the trigger circuit and the normally open contacts which have been engaged are subsequently opened to de-energize the power supply circuit.

When two or more induction heating coils are associated with a single trigger circuit, a second switch is provided to independently provide for switching between the induction heating coils. The normally closed contacts of the first and second switches are placed in series circuit relationship in the trigger circuit and additional normally open contacts are placed in parallel circuit relationship in the circuit for the individual induction heating coils. The normally open contacts of the first switch placed in the power supply circuit is connected in parallel with those of the second switch.

The power control arrangement of the invention comprises a second housing which may be integrally formed with the first housing, a second control shaft journaled through the first control shaft, a pinion gear mounted on the second shaft, a rack slidable along a predetermined path within the second housing, and a connecting wire coupled between the rack and the elevating mechanism to effect raising and lowering of the induction heating coil by rotation of the second control shaft.

The first and second control shafts are coupled by a lost motion connection which permits the first shaft to rotate within a range from the actuating position to the ON position and to further rotate therefrom to the restoring position to cause the second shaft to rotate therewith to thereby restore the elevating mechanism from the uppermost position to the lowermost position.

BRIEF DESCRIPTION OF THE DRAWINGS

These and other objects, features and advantages of the invention will be apparent from the following detailed description taken in conjunction with the accompanying drawings, in which:

FIG. 5 is a schematic circuit diagram of an induction heating apparatus with a single induction heating coil showing the placement of contacts of the switch unit in the power supply circuit and the trigger circuit of the apparatus;

FIG. 6 is a schematic circuit diagram of the induction heating apparatus with two induction heating coils, showing the placement of contacts of the switches associated with the respective coils;

FIG. 7 is a timing diagram of the operation of contacts of the switch unit;

FIG. 8 is a perspective view of an elevating mechanism of the power switching and control arrangement;

DESCRIPTION OF THE PREFERRED EMBODIMENTS

Figure 1:
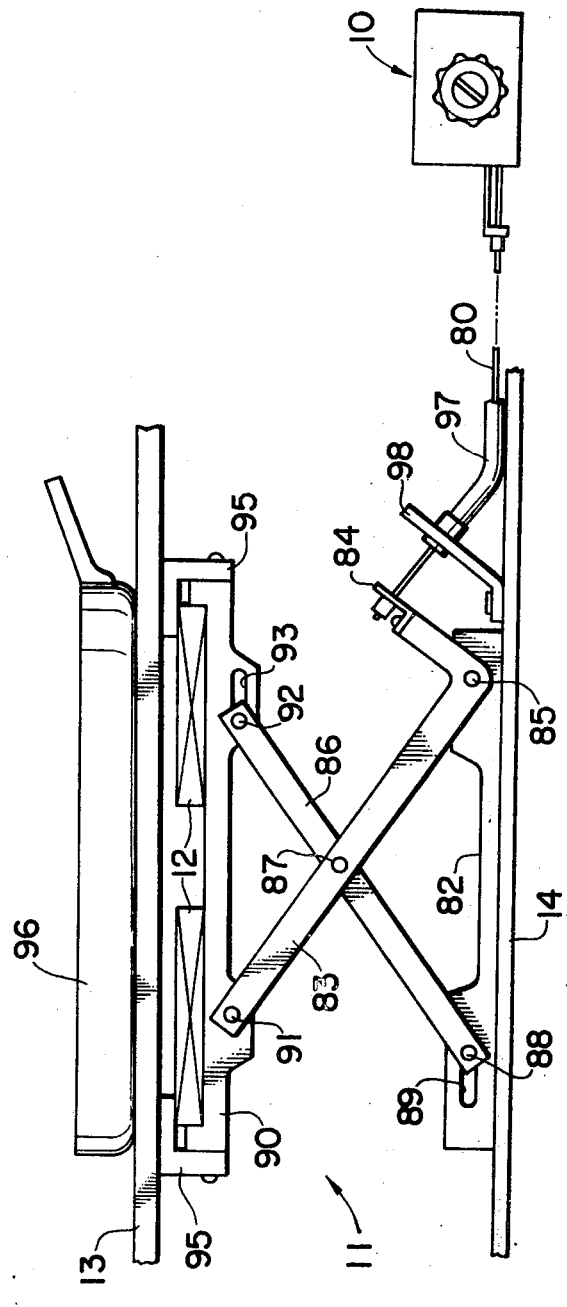
FIG. 1 is an elevational view of a power switching and control arrangement with an elevating mechanism being disposed underneath a utensil support of an induction heating apparatus, and a power switching and control unit.

Reference is now made to FIG. 1, wherein a power switching and control arrangement in accordance with the invention is shown and which generally comprises a power switch and control unit 10 which functions to provide switching of the various components of an induction heating apparatus to be described later and to provide control of the output power level, and an elevating mechanism 11 of a cross-arm type on which is placed an induction heating coil 12 adjustably beneath a non-metallic plate-like support 13 on which utensil will be placed during cooking, all of which are mounted on a support member 14.

Figure 2:
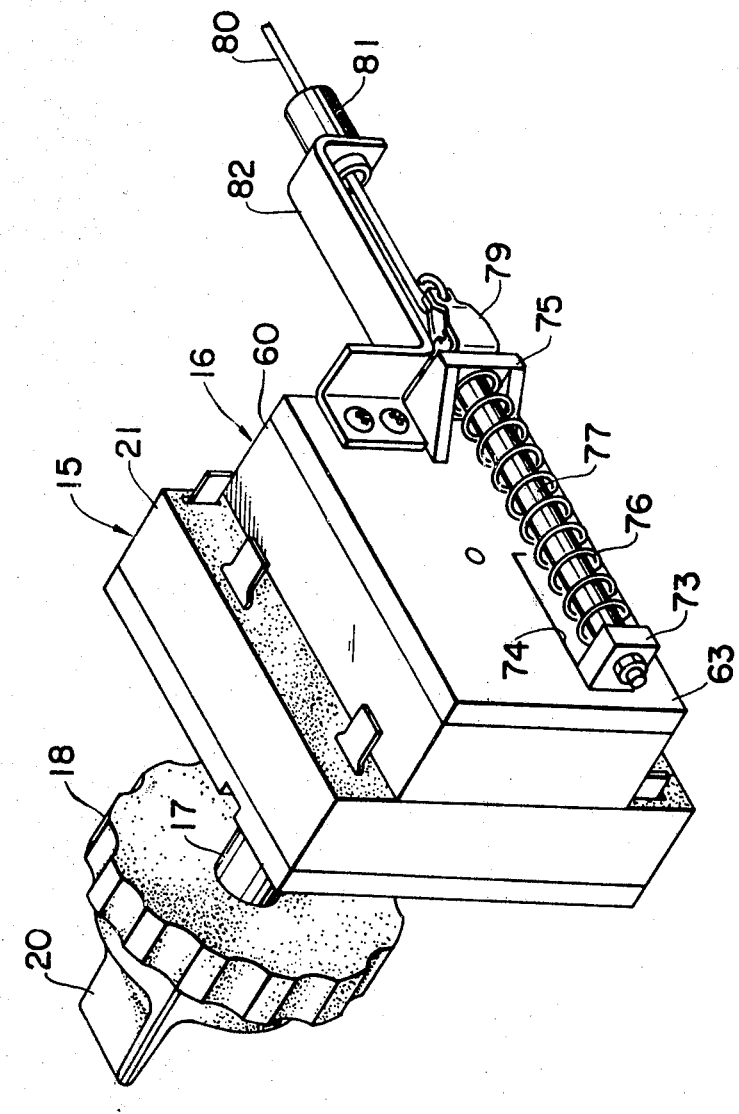
FIG. 2 is a perspective view of the power switching and control unit of FIG. 1.

The power switch and control unit 10 is shown in perspective view in FIG. 2 and comprises generally a switch 15, a power control mechanism 16, an outer control shaft 17 operatively associated with the switch mechanism 15, a switch knob 18 mounted on the knob 17, an inner control shaft 19 (FIG. 4) journaled through the outer shaft 17 and operatively associated with the power control mechanism 16, and a power control knob 20 mounted on the inner shaft 19.

Figure 3A:
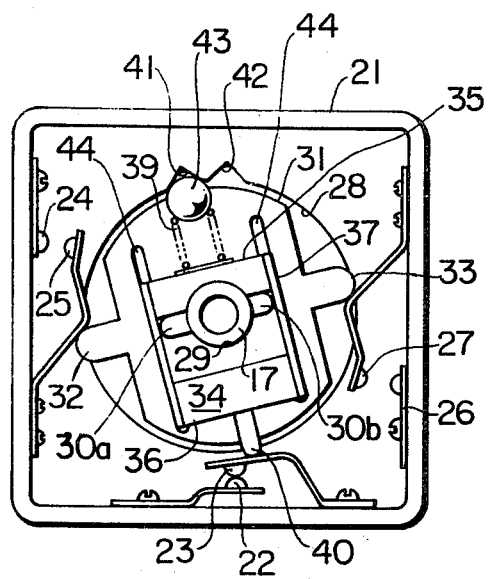
FIGS. 3A to 3D are elevational views of a switch unit of the invention showing a sequence of operations.

The switch unit 15 is shown in FIG. 3A in its normal position and comprises a housing 21, a normally closed contract pair comprised of a stationary contact 22 and a moving contact or operating member 23 of the contact pair mounted on a bottom wall of the housing, a first normally open contact pair comprised of a stationary contact 24 and a moving contact 25 mounted on a side wall of the housing, and a second normally open contact pair comprised of a stationary contact 26 and a moving contact 27 mounted on the other side wall of the housing 21. The housing 21 has on its rear wall thereof a generally circular recess 28 and a central bore 29 concentrical with the circular recess 28 as illustrated. The outer shaft 17 is rotatably disposed in the central bore 29 and is provided with a pair of cams 30a and 30b. A first actuator 31 is rotatably disposed in the recess 28 in coaxial relation with the shaft 17 and is provided with a pair of tongues or lugs 32 and 33 extending outwardly to engage the operating members 25 and 27 of the normally open contact pairs 24, 25 and 26, 27, and is provided with a pair of guide channels 44 thereon. A second actuator 34 is slidably engaged with the guide channels 44 and rotatably engageable with the first actuator 31 for rotation therewith and comprises an upper member 35 and a lower member 36 coupled thereto by a pair of side members 37 which are slidably received in the guide channels 44. The upper member 35 has an arcuate recess 38 (FIG. 3B) which is normally urged into contact with the circumferential surface of the outer control shaft 17 by means of a coil spring 39. The lower member 36 is provided with a projection 40 which is urged into engagement with the operating member 23 of the normally closed contact pair 22, 23 by the spring 39. The circular recess 28 has notches 41 and 42. A ball 43 is disposed on the upper end of the spring 39 and urged into engagement with the notch 41 when the switch is in normal or OFF position and movable with the first actuator 31 to engage the notch 42 in an ON position.

Figure 3B:
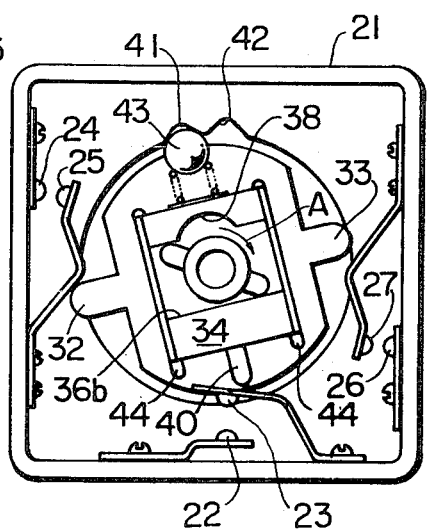
Figure 3C:
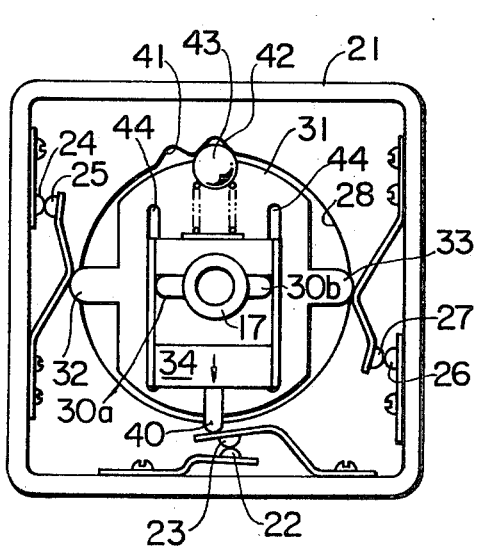

When the control shaft 17 is manually rotated clockwise as indicated by the arrow A shown in FIG. 3B, the cam 30a causes the second actuator 34 to move linearly with respect to the first actuator 31 in substantially an upward direction counteracting the spring 39 until the cam 30b comes into abutment with the actuating surface 36b of the lower member 36 so that the contacts 22 and 23 are disengaged from each other as shown in FIG. 3B. Upon the cams 30a and 30b being in abutment with the actuating surfaces of the upper and lower members 35 and 36 of the second actuator 34, the continued clockwise rotation of the shaft 17 will cause the second actuator to rotate clockwise. The first and second actuators 31 and 34 are coupled by a lost motion connection which permits the second actuator 34 to move in a limited range with respect to the rotational movement of the control shaft 17. Upon the rotation of the second actuator 34 with the control shaft 17, the first actuator is rotated with the second actuator 34 and the control shaft 17 until the ball or detent means 43 comes into engagement with the notch 42. With the first actuator 31 being in the actuating or ON position, the pair of lugs 32 and 33 comes into abutment with the operating members of the normally open contact pairs 24, 25 and 26, 27 while the normally closed contact pair 22 and 23 are disengaged from each other. Under this condition, the user is allowed to release the control shaft 17 which will cause it to rotate counterclockwise by the substantially downward or return movement of the second actuator 34 to normal the position due to the spring action of spring 39 so that the projection 40 again comes into engagement with the operating member 23 of the contact pair 22, 23 (FIG. 3C).

These contacts are advantageously interposed in an induction heating apparatus as schematically shown in FIGS. 5 and 6. In FIG. 5, the induction heating apparatus indicated generally by reference numeral 50 comprises a power supply circuit 51 including an alternating current power supply 52, a full-wave rectifier 53 coupled to the power circuit 51 to supply an unfiltered full-wave rectified high voltage potential to a pair of lines 54 and 55, a power conversion circuit 56 coupled to the pair of lines 54 and 55 and an induction heating coil 57 coupled to the conversion circuit 56. The power conversion circuit 56 includes a trigger circuit 58 which is coupled to the pair of lines to sense the zero point of the unfiltered unidirectional voltage to generate a train of low voltage pulses and a solid state inverter 59 which includes a silicon-controlled rectifier (SCR) and a diode connected in inverse parallel relationship thereto. The low voltage pulses are used to trigger the SCR to generate a high voltage ultrasonic frequency wave that drives the induction heating coil 57. The coil 57 generates an alternating magnetic field that extends across a gap including the utensil supporting member 13 and beyond the utensil supporting surface thereof. For further detail in connection with the induction heating apparatus, reference should be had to U.S. Pat. No. 3,821,509 issued to the same assignee.

In the circuit arrangement of FIG. 5, the normally closed contact pair 22, 23 of the switch unit 15 is interposed in the trigger circuit 58 as at $S_o$ in any suitable circuit connection so far as the contact $S_o$ provides switching of low current or voltage such as a base current of a transistor used in the trigger circuit 58. The detail of the placement of the contact $S_o$ is omitted for simplicity because it is obvious to those skilled in the art. The normally open contact pair 24, 25 is inserted in the power supply circuit 51 as at $S_1$.

With this arrangement and for energizing the apparatus 50, the contact $S_o$ is operated to disable the trigger circuit 58 for a predetermined period between $t_o$ to $t_1$ (FIG. 7), $t_o$ corresponding to the time at which the second actuator 34 is moved and $t_1$ corresponding to the time at which the second actuator is returned to the normal position. During this period the contact $S_1$ is operated to close its contacts to complete the power supply circuit 53 to supply a full-wave rectified unidirectional potential to the trigger circuit 58. It is appreciated that since the contact $S_1$ is closed prior to the closure of contacts $S_o$, no arc will be produced across the surfaces of contacts $S_1$ when the switch unit 15 is manipulated to energize the induction heating apparatus 50.

Figure 3D:
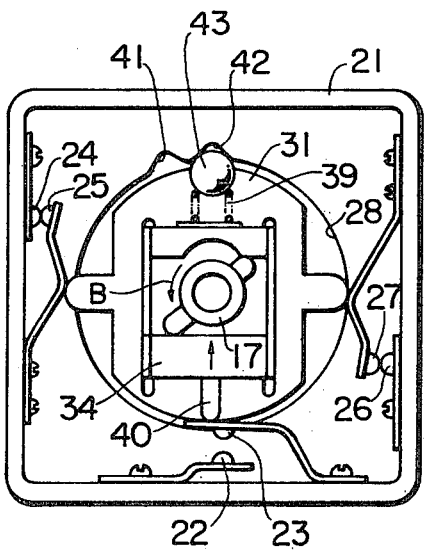

When the induction heating apparatus 50 is deenergized, the knob 18 of the switch unit 15 is rotated by the user in a counterclockwise direction as indicated by the arrow B in FIG. 3D. The second actuator 34 is moved upwardly counteracting the spring 39 as the cam 30a rotates counterclockwise in abutment contact with the actuating surface 36b of the lower member 36. At this moment, the contacts 22, 23 are disengaged from each other. As the rotation of control shaft 17 continues, the first actuator 31 comes into rotatable engagement with the second actuator 34 and the shaft 17 for rotation therewith and the detent means 43 is displaced from the notch 42 and comes into engagement with the notch 41 so that the switch is returned to the normal position as in FIG. 3A, whereupon the normally open contact pairs 24, 25 and 26, 27 which have been engaged are disengaged from each other.

It is understood that in FIG. 5 the trigger circuit 58 is disabled at a point in time $t_2$ when the contact $S_o$ is disengaged by the second actuator 34 prior to the disengagement of the contacts $S_1$ by the first actuator 31 to de-energize the rectifier 53. Therefore, no arc will be produced across the surfaces of the contacts $S_1$ placed in the power supply circuit 51. When the user releases the knob 18 the second actuator 34 is caused to return to the normal position to again engage the operating member 23 of the normally closed contact pair 23, 24 at time $t_3$.

It is often desirable to couple a plurality of induction heating coils to a single power conversion circuit 56. In such a case, individual power switching and control mechanisms should be provided to independently control the induction heating coils. In FIG. 6, two induction heating coils 57 and 57' are coupled to the power conversion circuit 56 and corresponding power switch contacts $S_1'$ and trigger switch contact $S_o'$ associated with a second switch unit 10 are inserted in respective circuits, as well as contacts $S_1$ and $S_o$ associated with the first switch unit 10 as described above with reference to FIG. 5. Additional switch contacts $S_2$ and $S_2'$ are provided, the former being associated with the first power switch unit and the latter with the second switch unit. In order to independently control the individual induction heating coils it is important that power switch contacts $S_1$ and $S_1'$ be connected in the power circuit 51 in parallel circuit relationship, trigger switch contacts $S_o$ and $S_o'$ be connected in the trigger circuit 58 in series circuit relationship, and coil switch contacts $S_2$ and $S_2'$ be connected in series circuit relationship to the respective individual induction heating coils 57 and 57'.

Assume that the induction heating coil 57 is being operated and the user desires to energize coil 57', the trigger contacts $S_o'$ will be disengaged to momentarily disable the trigger circuit for the duration between times $t_o$ and $t_1$ and during this period power contacts $S_1'$ and coil contacts $S_2'$ will be engaged. Upon closure of contacts $S_o'$ at $t_1$, the trigger circuit 58 will be again caused to start delivering low voltage trigger pulses to the inverter 59. With the two induction heating coils being energized and when the user desires to de-energize coil 57', the trigger circuit 58 will be momentarily de-energized for the duration between times $t_2$ and $t_3$ upon disengagement of trigger contacts $S_o'$.

Figure 4:
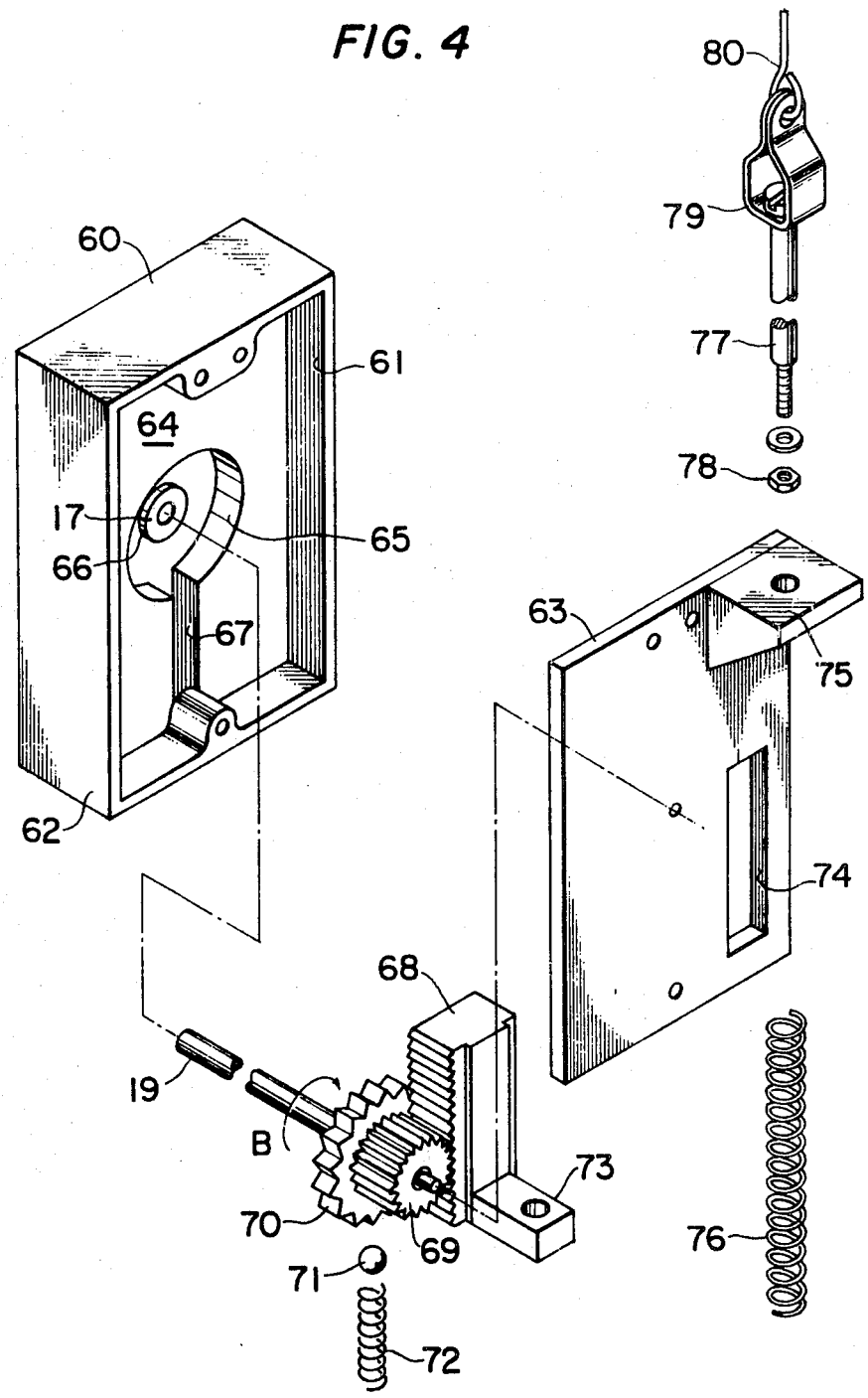
FIG. 4 is an exploded view of a power control unit of the power switching and control arrangement.

In order to control the heat generated in a utensil placed on the non-metallic utensil support 13 of the induction heating apparatus, the present invention contemplates the use of the power control unit 16 as referred to above. In FIG. 4, the power control unit 16 generally comprises a housing 60 having opposing side panels 61 and 62, a rear panel 63 and a front panel 64. The front panel 64 is provided with a circular recess 65, a central bore 66 therein through which one end of the control shaft 17 of the power switch unit 10 partly extends and an elongated slot 67. A rack 68 is disposed along the inner wall of the side panel 61. The control shaft 19 of the power control unit 16 is journaled through the control shaft 17 which is provided with an axial bore as referred to above. A pinion gear 69 is mounted on the shaft 19 to engage the rack 68 and a ratchet wheel 70 is mounted on the shaft 19 in side-by-side relation with the pinion 69 to be disposed in the circular recess 65 to engage a ball 71 which is urged toward the ratchet wheel 70 by spring 72 mounted in the slot 67. The rack 68 is provided with a perpendicular extension 73 which is slidably received in an elongated slot 74 formed in the rear panel 63. An apertured bracket 75 is secured to the rear panel 63. A counterbalance spring 76 is disposed between the extension 73 and the bracket 75, and a connecting rod 77 extends through the bracket 75, spring 76 and is fixed at one end to the extension 73 by nut 78. A connecting bracket 79 is attached to the other end of the connecting rod 77 in order to connect thereto one end of a connecting wire 80 through a bushing 81 (FIG. 2) supported on a bracket 82 secured to the rear panel 63.

In FIGS. 1 and 8, the power control elevating mechanism 11 comprises a pair of lower support members 82 mounted on the support 14, and a pair of L-shaped members 83 coupled to each other by an L-cross-sectioned transverse member 84 and pivotally connected at the angled corner thereof to the support 82 as at 85. An elongated member 86 extends in crossed, overlapping relation to and pivotally connected to the L-shaped member 83 as at 87 and slidably pivotally connected to the support 82 as at 88 through slot 89 formed in the support 82. A pair of upper support members 90 coupled to each other by transverse members 94 is disposed above the lower support 82 in parallel relation thereto. To the upper support 90 the L-shaped member 83 is pivotally connected as at 91 and the elongated member 86 is slidably pivotally connected as at 92 through slot 93 formed in the upper support 90. The induction heating coil 12 is supported on the upper support members 90 by a pair of L-cross-sectioned members 95 beneath the non-metallic unbroken utensil support 13 on which utensil 96 is placed.

The connecting wire 80 has is coupled to the transverse member 84, coupled to the end of the short arm sections of the L-shaped members 83, an d extends through a conduit or pipe 97 secured to a support 98 mounted on the support plate 14.

By rotation of the inner control shaft 19 by means of knob 20 in a direction as indicated by the arrow B in FIG. 4, the rack 68 is caused to move along the slot 74 of the rear panel 63 and the connecting wire 80 is pulled in a direction to permit upward movement of the induction heating coil 12. To permit downward movement of the coil 12, the connecting wire 80 should be pulled by an amount which is slightly smaller than the gravitational force which tends to lower the upper support members 90 plus induction heating coil 12. The heating coil is held in a suitable position by a detent means including the ball 71 and spring 72 which urges the ball to the ratchet wheel 70. Therefore, the spring 72 should exert a force slightly greater than the difference between the gravitational force and the force of spring 76.

Figure 9:
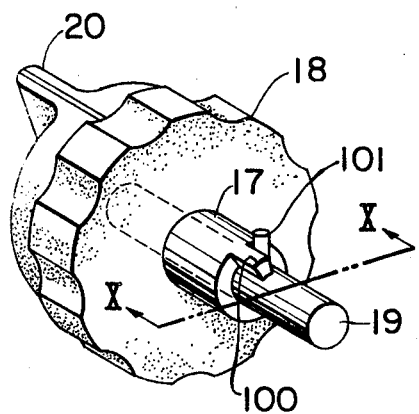
FIG. 9 is a perspective view of control shafts associated with the switch and power control units shown coupled with each other by a lost motion connection.
Figure 10:
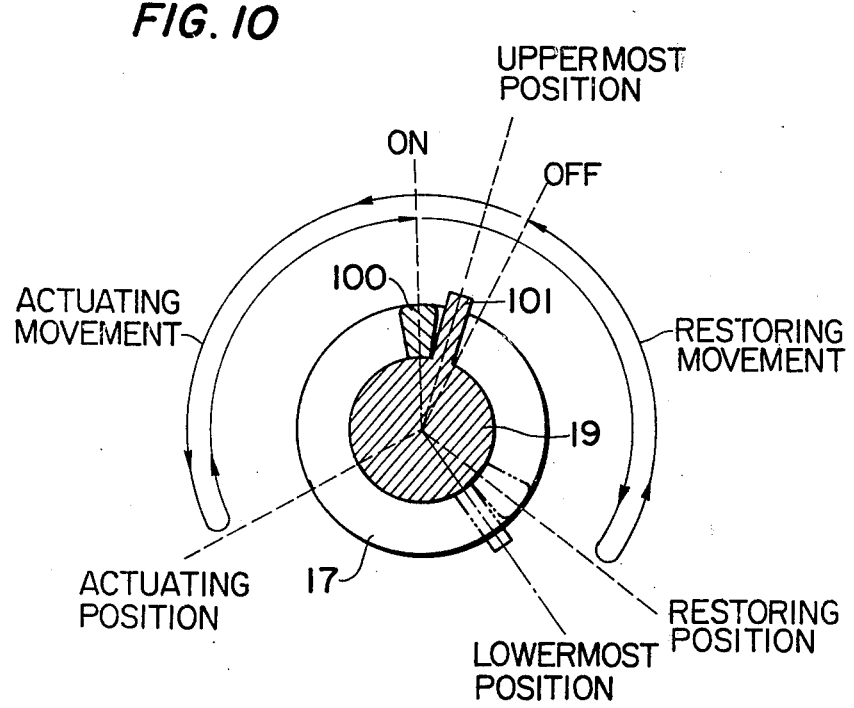
FIG. 10 is a cross-sectional view taken along line 9—9 of FIG. 9 for explanation of the lost motion connection.

In accordance with one aspect of the invention, the outer control shaft 17 is provided with a lug 100 (FIG. 9). A pin 101 is mounted on the inner shaft 19 to engage the lug 100 in a manner that permits the outer shaft to move in a limited range between the actuating position and its OFF position as illustrated in FIG. 10. When the outer shaft is rotated clockwise from the ON position to de-energize the induction heating apparatus, the lug 100 drives the inner shaft in rotation with the outer shaft, with the lug 100 in abutment with the pin 101, to the restoring position so that the induction heating coil 12 is lowered from the uppermost (or any position) position to the lowermost position (normal position) as shown in broken lines. Upon release of the outer control shaft 17, it will be returned to the OFF position by spring action. Therefore it may be understood that when the switch 10 is manipulated to de-energize the apparatus the elevating mechanism 11 is automatically restored to its normal lowermost position.

The foregoing description shows only preferred embodiment of the present invention. Various modifications are apparent to those skilled in the art without departing from the scope of the present invention which is only limited by the appended claims. Therefore, the embodiments shown and described are only illustrative, not restrictive.

What is claimed is:

1. In an induction heating apparatus including a power supply circuit coupled to an alternating current power source, rectifier means for supplying a rectified high voltage excitation potential to a pair of terminals, a substantially non-metallic plate-like support having a substantially unbroken utensil supporting surface, an induction heating coil mounted adjustably beneath said support for generating an alternating magnetic field that extends across a gap including said support and beyond said utensil supporting surface, a static power conversion circuit coupled to said pair of terminals and including a solid state inverter responsive to trigger pulses for generating a high voltage ultrasonic frequency wave that drives said induction heating coil, and a trigger circuit for triggering said inverter with trigger pulses, the combination comprising:

a switch including a housing, a control shaft mounted in said housing and rotatable in a range between inactive and active positions, a normally open contact pair and a normally closed contact pair mounted in said housing, a first actuator engageable with said control shaft for rotation therewith between said inactive position in which said first actuator remains disengaged from contact with said normally open contact pair and said active position in which said first actuator is in engagement contact with said normally open contact pair, a second actuator normally biased to engage and open said normally closed contact pair and operatively coupled with said shaft for rotation therewith and engageable with said first actuator by a lost motion connection which permits said second actuator to move in a limited range with respect to the rotational movement of said shaft to disengage from contact with and close said normally closed contact pair and permits said first actuator to be operatively coupled with said shaft for rotation therewith in a range from said inactive position to said active position;

said normally open contact pair being interposed in said power supply circuit and said normally closed contact pair being interposed in said trigger circuit.

2. The combination as claimed in claim 1, wherein said second actuator is linearly movably mounted on said first actuator to be moved in a direction normal to the axis of said shaft within said limited range.

3. The combination as claimed in claim 1, including means for moving said induction heating coil relative to said plate-like support to independently control power coupled to the utensil by changing the gap between said coil and support.

4. The combination as claimed in claim 3, wherein said moving means is a cross-arm elevating mechanism.

5. The combination as claimed in claim 4, wherein said control shaft is hollow, and wherein said cross-arm elevating mechanism comprises a first support member, an L member pivotally connected at the angled corner thereof to said first support member, an elongated member extending in crossed, overlapping relation to and pivotally connected to said L member at the locality of their crossing and slidably pivotally connected at the lower end thereof to said first support member, a second support member disposed beneath said utensil supporting surface and on which said induction heating coil is mounted, the upper end of said elongated member and the long arm of said L member being operatively connected to said second support member, a second control shaft journaled through said first control shaft and carrying a toothed wheel, a rack slidably mounted in said housing and engaged with said toothed wheel, connecting means coupling said rack and the extreme end of the short arm of said L member, and means to counterbalance the downward movement of said second support due to gravitational force exerted thereon.

6. The combination as claimed in claim 5, wherein said first and second control shafts are coupled by a lost motion means which permits said first shaft to rotate in a limited range with respect to the rotational movement of said second shaft so that said second shaft is rotated from a position in which said induction heating coil is in an uppermost position to a position in which said coil is in a lowermost position when said first shaft is rotated from said active position to said inactive position.

7. The combination as claimed in claim 5, including means for coupling said first and second shafts by a lost motion connection which permits said first shaft to rotate in a first range from said active position to a point intermediate between said active and inactive positions and to move in a second range from said intermediate position to said inactive position in engagement with said second shaft.

8. The combination as claimed in claim 5, wherein said counterbalancing means comprises a first spring mounted on said rack and said housing to urge said rack in a direction opposite to the direction of movement thereof due to said downward movement, a second toothed wheel mounted on said second shaft, a detent means mounted on said housing to engage one of the teeth of said second wheel, and a second spring to urge said detent means to said second wheel, said second spring having a force slightly greater than the difference between said gravitational force and the force of said first spring.

9. In an induction heating apparatus including a power supply circuit coupled to an alternating current power source, rectifier means for supplying a rectified high voltage excitation potential to a pair of terminals, an induction heating coil, a static power conversion circuit coupled to said pair of terminals and including a solid state inverter for generating a high voltage ultrasonic frequency wave that drives said induction heating coil and a trigger circuit for triggering said inverter with low voltage pulses, the combination comprising:

a switch including a housing, a control shaft having a pair of cams and rotatably mounted in said housing, a normally open contact pair and a normally closed contact pair mounted in said housing, a first actuator rotatably mounted in said housing to engage an operating member of said normally open contact pair, a second actuator normally spring biased to engage an operating member of said normally closed contact pair and said pair of cams and linearly movably mounted on said first actuator for transmitting the rotational movement of said shaft to said first actuator by a lostmotion connection which permits said second actuator to move in a direction normal to the axis of said shaft within a limited range with respect to the rotational movement of said shaft to disengage from said operating member of said normally closed contact pair;

said normally open contact pair being interposed in said power supply circuit and said normally closed contact pair being interposed in said trigger circuit.

10. In an induction heating apparatus including a power supply circuit coupled to an alternating current power source, rectifier means for supplying a rectified high voltage excitation potential to a pair of terminals, substantially non-metallic plate-like support having a substantially unbroken utensil supporting surface, an induction heating coil mounted adjustably beneath said support for generating an alternating magnetic field that extends across a gap including said support and beyond said utensil supporting surface, a static power conversion circuit coupled to said pair of terminals and including a solid state inverter for generating a high voltage ultrasonic frequency wave that drives said induction heating coil, the combination comprising:

a power control means including a first support member, an L member pivotally connected at the angled corner thereof to said first support member, an elongated member extending in crossed, overlapping relation to and pivotally connected to said L member at the locality of their crossing and slidably pivotally connected at the lower end thereof to said first support member, a second support member disposed beneath said utensil supporting surface and on which said induction heating coil is mounted, the upper end of said elongated member and the long arm of said L member being operatively connected to said second support member, a housing, a control shaft rotatably mounted in said housing and carrying a toothed wheel, a rack slidably mounted in said housing and engageable with said toothed wheel, connecting means coupling said rack and the extreme end of the short arm of said L member, and means to counterbalance the downward movement of said second support due to gravitational force exerted thereon.

11. In an induction heating apparatus including a power supply circuit coupled to an alternating current power source, rectifier means for supplying a rectified high voltage excitation potential to a pair of terminals, first and second induction heating coils, a static power conversion circuit coupled to said pair of terminals and including a solid state inverter for generating a high voltage ultrasonic frequency wave that drives said induction heating coils and a trigger circuit for triggering said inverter with low voltage pulses, first and second circuits connecting said solid state inverter to said first and second induction heating coils, respectively, the combination comprising:

first and second switches each having a housing, a control shaft having a pair of cams and rotatably mounted in said housing, first and second normally open contact pairs mounted in said housing, a third normally closed contact pair mounted in said housing, a first actuator rotatably mounted in said housing to engage operating members of said first and second contact pairs, a second actuator normally spring biased to engage an operating member of said third contact pair and said pair of cams and linealy movably mounted on said first actuator for transmitting the rotational movement of said shaft to said first actuator by a lost-motion connection which permits said second actuator to move in a direction normal to the axis of said shaft within a limited range with respect to the rotational movement of said shaft to disengage from said operating member of said third contact pair;

said first contact pairs of said first and second switches being interposed in said power supply circuit in parallel circuit relationship, said second contact pairs of said first and second switches being interposed in said first and second connecting circuits in parallel circuit relationship, and said third contact pairs of said first and second switches being interposed in said trigger circuit in series circuit relationship.

12. In an induction heating apparatus including a power supply circuit coupled to an alternating current power source, rectifier means for supplying a rectified high voltage excitation potential to a pair of terminals, substantially non-metallic plate-like support having a substantially unbroken utensil supporting surface, an induction heating coil mounted adjustably beneath said support for generating an alternating magnetic field that extends across a gap including said support and beyond said utensil supporting surface, a static power conversion circuit coupled to said pair of terminals and including a solid state inverter for generating a high voltage ultrasonic frequency wave that drives said induction heating coil and a trigger circuit for triggering said inverter with low voltage pulses, in combination therewith, a power switching and control arrangement comprising:

a switch including a housing, a first hollow control shaft having a pair of cams and rotatably mounted in said housing, a normally open contact pair and a normally closed contact pair mounted in said housing, a first actuator rotatably mounted in said housing in coaxial relation with said shaft, a second actuator normally spring biased to engage an operating member of said normally closed contact pair and operatively coupled with said shaft for rotation therewith and engageable with said first actuator by a lost-motion connection which permits said second actuator to move in a limited range to disengage from said operating member, whereby said first actuator is operatively coupled with said shaft for rotation therewith to engage an operating member of said normally open contact pair;

said normally open contact pair being interposed in said power supply circuit and said normally closed contact pair being interposed in said trigger circuit; and a power control means including a first support member, an L member pivotally connected at the angled corner thereof to said first support member, an elongated member extending in crossed, overlapping relation to and pivotally connected to said L member at the locality of their crossing and slidably pivotally connected at the lower end thereof to said first support member, a second support member disposed beneath said utensil supporting surface and on which said induction heating coil is mounted, the upper end of said elongated member and the long arm of said L member being operatively connected to said second support member, a second control shaft journaled through said first control shaft and carrying a toothed wheel, a rack slidably mounted in said housing and engageable with said toothed wheel, connecting means coupling said rack and the extreme end of the short arm of said L member, and means to counterbalance the downward movement of said second support due to gravitational force exerted thereon.

13. In an induction heating apparatus including a power supply circuit coupled to an alternating current power source, rectifier means for supplying a rectified high voltage excitation potential to a pair of terminals, an induction heating coil, a static power conversion circuit coupled to said pair of terminals and including a solid state inverter for generating a high voltage ultrasonic frequency wave that drives said induction heating coil and a trigger circuit for triggering said inverter with low voltage pulses, the combination comprising:

a switch including a manually actuable means movable between first and second positions, a normally closed contact pair, a normally open contact pair, first means responsive to said manually actuable means and operable for a predetermined period to disengage said closed contact pair for said period, second means responsive to said first means to engage said open contact pair during said period when said manually actuable means is being moved from said first to second positions and to disengage said open contact pair when said manually actuable means is being moved from said second to first positions, and third means responsive to said second means for maintaining said second means in an operating condition;

said normally open contact pair being interposed in said power supply circuit and said normally closed contact pair being interposed in said trigger circuit.

14. In an induction heating apparatus including a power supply circuit coupled to an alternating current power source, rectifier means for supplying a rectified high voltage excitation potential to a pair of terminals, an induction heating coil, a static power conversion circuit coupled to said pair of terminals and including a solid state inverter for generating a high voltage ultrasonic frequency wave that drives said induction heating coil and a trigger circuit for triggering said inverter with low voltage pulses, the combination comprising:

a switch including a housing, a control shaft movably mounted in said housing, a normally open contact pair and a normally closed contact pair mounted in said housing, a first actuator movably mounted in said housing between first and second positions, a second actuator normally biased to engage an operating member of said normally closed contact pair and operatively coupled with said shaft for movement therewith and engageable with said first actuator by a lost-motion connection which permits said second actuator to move in a limited range to disengage from said operating member, whereby said first actuator is operatively coupled with said shaft for movement therewith to move between said first and second positions to engage an operating member of said normally open contact pair, and a detent means mounted in said housing to maintain said first actuator in said first or second positions;

said normally open contact pair being interposed in said power supply circuit and said normally closed contact pair being interposed in said trigger circuit.

15. A uniaxial power switching and control mechanism comprising:

a switch including a first housing, a hollow control shaft rotatably mounted in said housing between actuating and restoring positions with an intermediate position therebetween, a normally open contact pair and a normally closed contact pair mounted in said housing, a first actuator rotatably mounted in said housing in coaxial relation with said shaft, a second actuator normally biased to engage an operating member of said normally closed contact pair and operatively coupled with said shaft for rotation therewith and rotatably engageable with said first actuator by a lost motion connection which permits said second actuator to move in a limited range with respect to the rotational movement of said shaft to disengage from said operating member, whereby said first actuator is operatively coupled with said shaft for rotation therewith to engage an operating member of said normally open contact pair; and power control means including a second housing, a second control shaft journaled through said first control shaft, a toothed wheel mounted on said second shaft, and a rack slidably mounted in said housing and engageable with said toothed wheel; and means for coupling said first and second shafts by a lost motion connection which permits said first shaft to move in a first range from said actuating position to said intermediate position and to move in a second range from said intermediate position to said restoring position in engagement with said second shaft.

16. A uniaxial power switching and control mechanism as claimed in claim 15 including an elevating mechanism and connecting means coupling said rack and said elevating mechanism, whereby said elevating mechanism is operated by manual rotation of said second control shaft.

17. A uniaxial power switching and control mechanism as claimed in claim 16, wherein said elevating mechanism comprises a first support, an L member pivotally connected at the angled corner thereof to said first support member, an elongated member extending in crossed, overlapping relation to and pivotally connected to said L member at the locality of their crossing and slidably pivotally connected at the lower end thereof to said first support a second support disposed in parallel with said first support, the upper end of said elongated member and the long arm of said L member being operatively connected to said second support, and said connecting means being coupled to the short arm of said L member.

* * * * *

UNITED STATES PATENT OFFICE
CERTIFICATE OF CORRECTION

Patent No. 3,987,268            Dated October 19, 1976

Inventor(s) Shigeru MAEDA and Akira ITHUZI

It is certified that error appears in the above-identified patent and that said Letters Patent are hereby corrected as shown below:

In the first sheet the foreign application priority data is added as follows:

--[30] Foreign Application Priority Data

Sept. 28, 1973 Japan.................48-109580
Sept. 28, 1973 Japan.................48-113644
Dec. 12, 1973 Japan..................48-142472
Dec. 12, 1973 Japan..................48-142473 --

Signed and Sealed this

Fifteenth Day of March 1977

[SEAL]

Attest:

RUTH C. MASON
*Attesting Officer*

C. MARSHALL DANN
*Commissioner of Patents and Trademarks*